(12) United States Patent
Statman

(10) Patent No.: US 11,063,444 B2
(45) Date of Patent: *Jul. 13, 2021

(54) ENHANCED BATTERY MANAGEMENT SYSTEM FOR BATTERY PACK

(71) Applicant: Powin, LLC, Tualatin, OR (US)

(72) Inventor: Stu Statman, Portland, OR (US)

(73) Assignee: Powin, LLC, Tualatin, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/101,045

(22) Filed: Aug. 10, 2018

(65) Prior Publication Data

US 2020/0052503 A1 Feb. 13, 2020

(51) Int. Cl.
*H02J 7/00* (2006.01)
*H01M 10/42* (2006.01)
*G06F 3/0482* (2013.01)

(52) U.S. Cl.
CPC .......... *H02J 7/0014* (2013.01); *G06F 3/0482* (2013.01); *H01M 10/425* (2013.01); *H01M 10/4207* (2013.01); *H02J 7/0047* (2013.01); *H01M 2010/4271* (2013.01); *H02J 7/0048* (2020.01)

(58) Field of Classification Search
CPC .................................................. H02J 7/0014
USPC ...................................................... 320/119
See application file for complete search history.

(56) References Cited

U.S. PATENT DOCUMENTS

| | | | |
|---|---|---|---|
| 6,555,991 B1 | 4/2003 | Zettel et al. | |
| 2003/0160593 A1* | 8/2003 | Yau | H02J 7/0018 320/116 |
| 2009/0208824 A1 | 8/2009 | Greening et al. | |
| 2012/0074898 A1 | 3/2012 | Schwartz | |
| 2012/0105001 A1* | 5/2012 | Gallegos | H02J 7/0027 320/109 |
| 2013/0002016 A1* | 1/2013 | Furukawa | H01M 10/425 307/9.1 |
| 2013/0026993 A1* | 1/2013 | Hintz | H02J 7/0016 320/119 |
| 2013/0043840 A1 | 2/2013 | Bylsma et al. | |
| 2013/0063094 A1 | 3/2013 | Gibbs et al. | |
| 2013/0099746 A1 | 4/2013 | Nork et al. | |
| 2014/0042972 A1 | 2/2014 | Kim et al. | |
| 2014/0152261 A1* | 6/2014 | Yamauchi | H01M 10/425 320/118 |

(Continued)

OTHER PUBLICATIONS

International Search Report and Written Opinion issued in International Application No. PCT/US2019/045678, dated Dec. 16, 2019, 12 pages.

(Continued)

*Primary Examiner* — Yalkew Fantu

(74) *Attorney, Agent, or Firm* — Klarquist Sparkman, LLP

(57) ABSTRACT

One or more of the present embodiments provide for a suite of preset and customizable balancing applications that can be configured, selected and implemented to match the requirements a present use case. The suite of preset and customizable balancing applications may be presented to and selected by a user to tailor the balancing system to a particular use case. Alternatively, the balancing system may automatically select a balancing application, such as based on one or more inputs, to tailor the balancing system to the present use case.

18 Claims, 6 Drawing Sheets

(56) References Cited

U.S. PATENT DOCUMENTS

| | | | |
|---|---|---|---|
| 2014/0253135 A1 | 9/2014 | Eguchi et al. | |
| 2014/0306666 A1* | 10/2014 | Choi | H02J 7/0016 |
| | | | 320/134 |
| 2016/0049809 A1 | 2/2016 | Kajitani et al. | |
| 2016/0301222 A1* | 10/2016 | Samuel | H02J 7/0021 |
| 2016/0336765 A1 | 11/2016 | Trimboli et al. | |
| 2018/0358823 A1* | 12/2018 | Lemmen | H02J 7/342 |

OTHER PUBLICATIONS

International Search Report and Written Opinion issued in International Application No. PCT/US2019/045696, dated Dec. 11, 2019, 12 pages.

\* cited by examiner

ENHANCED BATTERY MANAGEMENT SYSTEM FOR BATTERY PACK

FIELD

This application relates to enhanced battery management systems for balancing battery cells of battery packs.

BACKGROUND

High performance battery systems have been developed and deployed for different use-case applications, such as for grid and microgrid energy storage and management, and for renewable energy integration (e.g., solar, wind, hydro, etc.). For example, solar energy may be collected and stored in the battery systems for use during high energy consumption times, such as during summer months when energy demands for air-conditioning are well above average. To maximize the capacity of the battery systems and to utilize the battery systems safely, battery balancing techniques and strategies have been deployed. For example, when battery cell voltages dip below a lower limit, the battery cells become a fire hazard and must be discarded. Likewise, if battery cells are overcharged and the battery cell voltages rise above an upper limit, the battery cells also become a fire hazard.

Various active and passive balancing techniques have been developed to allow for more of a battery to be used when charging and discharging, and to increase safety. However, there are costs to active and passive balancing. For example, passive balancing discards energy by discharging battery cells that are above a threshold with respect to an average cell voltage, leading to parasitic and efficiency losses. Active balancing often uses low efficiency components to charge, leading to even greater efficiency losses. Although various balancing strategies have been developed, the balancing strategy is deployed as a static decision for most battery systems, such as deploying simple balancing techniques to balance cell voltages to an average cell voltage for all cells or balancing to a target voltage. However, different use cases could be improved by employing more efficient and robust balancing strategies.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One or more of the present embodiments provide for a battery cell balancing system and strategy that delivers more efficient use of battery capacities as needed for different use cases. For example, a balancing circuit is provided to support targeted battery cell passive and active balancing according to a balancing strategy for the use cases. Further the balancing circuit allows for cell balancing to be performed while the battery cells are collectively being charged or discharged.

Further, instead of having a static, single balancing strategy, one or more the present embodiments provide for a suite of preset and customizable balancing applications that can be configured, selected and implemented to match the requirements a present use case. The suite of preset and customizable balancing applications may be presented to and selected by a user to tailor the balancing system to a particular use case. Alternatively, the balancing system may automatically select a balancing application, such as based on one or more inputs, to tailor the balancing system to the present use case.

In one embodiment, a method is provided for balancing cell groups. The method includes receiving a balancing profile by a battery management system via an application programming interface (API) and controlling a plurality of cell group string controllers by the battery management system based on the received balancing profile. The method also includes controlling a plurality of cell group balancing controllers by the plurality of string controllers to balance the cell groups.

In a further embodiment, a cell group balancing system is provided. The cell group balancing system includes a plurality of cell groups and an energy management system. The energy management system is provided with a graphical user interface and is configured to present a menu of user selectable balancing applications and receive a user selected balancing application via the graphical user interface. The energy management system is further configured to transmit instructions for balancing the plurality of cell groups based on the user selected balancing application via an application programming interface (API).

In another embodiment, another method for balancing cell groups is provided. The method includes receiving a balancing application based on a user selection from a library of balancing applications, generating balancing instructions based on the balancing application, and transmitting the balancing instructions for balancing the cell groups via an application programming interface (API). The method also includes balancing the cell groups based on the balancing instructions via low level cell group control.

The foregoing and other objects, features, and advantages of the invention will become more apparent from the following detailed description, which proceeds with reference to the accompanying figures.

DETAILED DESCRIPTION

I. General Considerations

Figure 1:
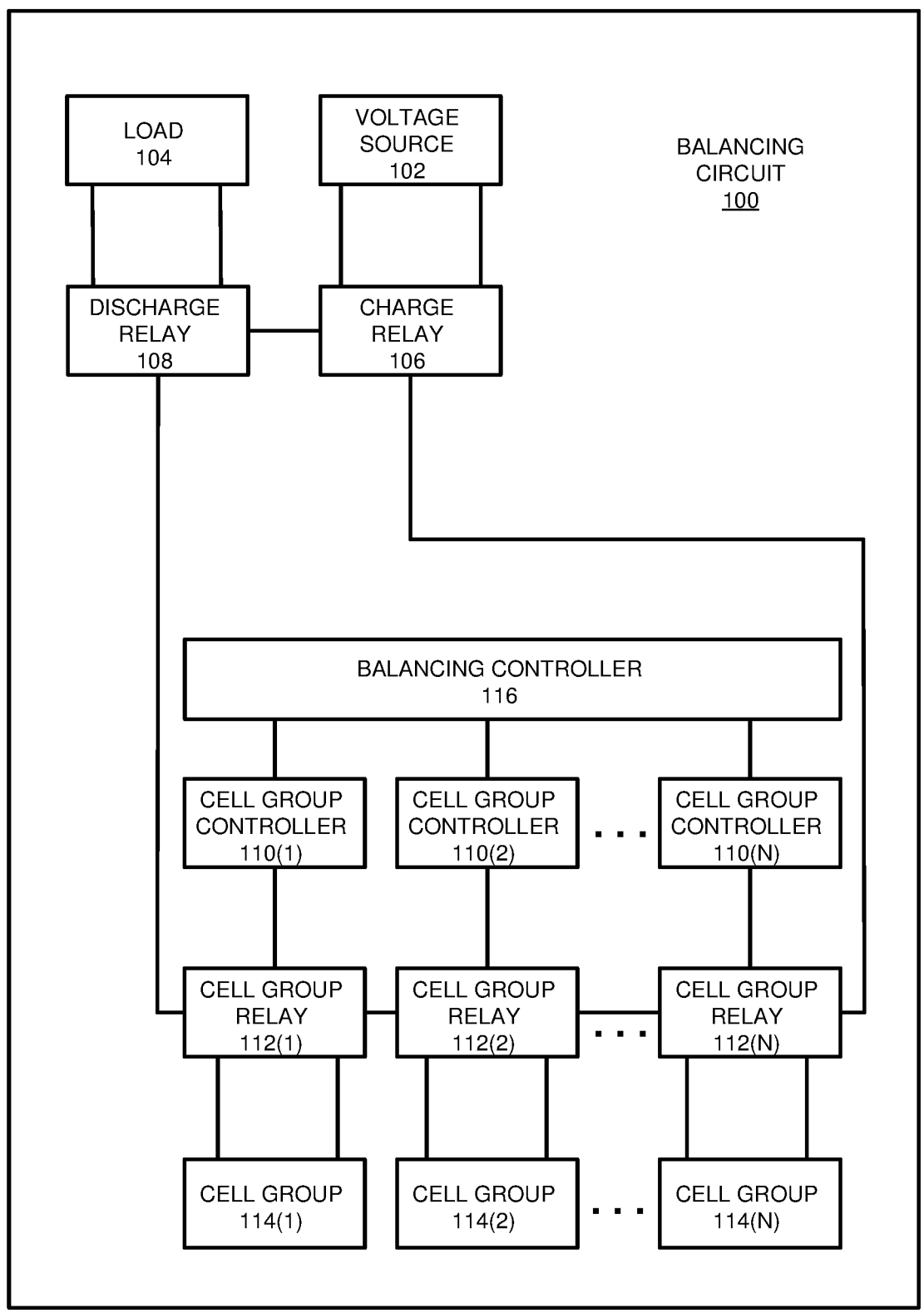
FIG. 1 is a diagram illustrating an example balancing circuit with which one or more of the approaches described herein may be implemented.

Disclosed below are representative embodiments of methods, apparatus, and systems for a battery cell balancing system and implementing a battery cell balancing strategy. The disclosed methods, apparatus, and systems should not be construed as limiting in any way. Instead, the present disclosure is directed toward all novel and nonobvious features and aspects of the various disclosed embodiments, alone or in various combinations and subcombinations with one another. Furthermore, any features or aspects of the disclosed embodiments may be used in various combinations and subcombinations with one another. For example, one or more system components or method acts from one embodiment may be used with one or more system components or method acts from another embodiment, and vice versa. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods may be used in conjunction with other methods. Additionally, the description sometimes uses terms like "determine," "generate" and "evaluate" to describe the disclosed technology. These terms are high-level abstractions of the actual operations that are performed. The actual operations that correspond to these terms may vary depending on the particular implementation and are readily discernible by one of ordinary skill in the art.

Various alternatives to the examples described herein are possible. For example, some of the methods described herein may be altered by changing the ordering of the method acts described, by splitting, repeating, or omitting certain method acts, etc. The various aspects of the disclosed technology may be used in combination or separately. Different embodiments use one or more of the described innovations. Some of the innovations described herein address one or more of the problems noted in the background. Typically, a given technique/tool does not solve all such problems.

As used in this application and in the claims, the singular forms "a," "an," and "the" include the plural forms unless the context clearly dictates otherwise. Additionally, the term "includes" means "comprises." Further, as used herein, the term "and/or" means any one item or combination of any items in the phrase.

II. Introduction to the Disclosed Technology

One or more the present embodiments provide for a battery cell balancing system and strategy that delivers more efficient use of battery capacities as needed for different use cases. For example, a balancing circuit is provided to support targeted battery cell passive and active balancing according to a balancing strategy. Further the balancing circuit allows for balancing to be performed while the battery cells are collectively being charged or discharged for the application use case.

Further, in certain embodiments, instead of having a static, single balancing strategy, a suite of preset and customizable balancing applications is provided that can be configured, selected and/or implemented to match the requirements an application use case. The suite of preset and customizable balancing applications may be presented to and selected by a user to tailor the balancing system to a particular use case. Alternatively, the balancing system may automatically select a balancing application based on one or more inputs to tailor the balancing system to the use case.

III. Example Embodiments

The embodiments discussed below provide and/or utilize a balancing circuit to balance a plurality of battery cells or battery cell groups. For example, the balancing circuit may be provided as a circuit dedicated to balancing. One or more balancing strategies may be implemented using the balancing circuit, allowing for selecting a balancing strategy that is specifically tailored to a use case application. For example, a mix of passive balancing and target charging can be used to charge and/or discharge balance the plurality of battery cells or battery cell groups. Implementing the selected balancing strategy allows for the battery cells to more efficiently and effectively satisfy the requirements of the use case application while increasing safety and lifespan of the battery cells.

A. Example Systems

FIG. 1 is a schematic block diagram illustrating an example balancing circuit with which one or more of the approaches described herein may be implemented. The balancing circuit may be implemented in a larger battery cell balancing system configured to implement a balancing strategy to deliver more efficient battery usage as needed for different use cases. For example, depending on the use case, single battery cells may be targeted for passive and active balancing. Further, the targeted passive and active balancing may be provided while the battery cells are in use (e.g., the battery cells are being charged or discharged).

With reference to FIG. 1, the balancing circuit 100 illustrates components of a battery pack. For example, the balancing circuit (100) includes a voltage source (102) and a load (104). The voltage source (102) is any voltage source capable of charging battery cells, such as a balancing charger. For example, the voltage source (102) is a battery charger configured to convert alternating current to direct current for charging a battery cell or battery cell group. The voltage source (102) can also be configured to convert three-phase to single-phase alternating current. The voltage source can be coupled to a generator, such as in conjunction with a renewable energy source or coupled to an energy grid or microgrid, such as via an inverter or an AC power supply. The load (104) is any electrical load, such as a resistor, inductor, capacitor, another component, or a combination of components acting as an electrical load for consuming electric energy.

The voltage source (102) is coupled to the balancing circuit (100) via a charge balancing relay (106) and the load (104) is coupled to the balancing circuit (100) via a discharge balancing relay (108). The charge balancing relay (106) is configured to selectively couple the voltage source (102) to the balancing circuit (100) for charging a battery cell or cell group. Likewise, the discharge balancing relay (108) is configured to selectively couple the load (104) to the balancing circuit (100) for discharging a battery cell or cell group. As will be discussed below, the voltage source (102) or the load (104) is connected or disconnected from the balancing circuit (100) to facilitate a charge balancing configuration, a discharge balancing configuration, or a no balancing configuration.

For example, the voltage source (102) and load (104) may be provided at a higher level than the battery cells, such as at the same control level as the balancing controller (116)

(discussed below). In an embodiment, the voltage source (102) is coupled to the balancing circuit (100) via a double-pole, single throw (DPST) charge relay (106). When the charge relay (106) is closed, the voltage source (102) may charge a cell group coupled to the balancing circuit (100). Likewise, the load (104) is coupled to the balancing circuit (100) through a DPST discharge relay (108). When the discharge relay (108) is closed, the load (104) may discharge a cell group coupled to the balancing circuit (100).

In the example illustrated in FIG. 1, the voltage source (102) or the load (104) are configured to be coupled to the charge balancing circuit (100) in series. Therefore, at any point in time, the charge balancing circuit (100) may be configured to either charge or discharge one battery cell or cell group during that time. In other embodiments, the voltage source (102) or the load (104) configured to be coupled to the charge balancing circuit (100) in a manner allowing for concurrently charging one battery cell or cell group while discharging a different battery cell or cell group.

The charge balancing circuit (100) includes a plurality of cell group controllers (110(1), 110(2), . . . , 110(N)). For example, the cell group controllers are (110(1), 110(2), . . . , 110(N)) are battery module controllers (BMCs) or like controllers. Each of the cell group controllers (110(1), 110(2), . . . , 110(N)) is configured to couple one of a plurality of cell groups (114(1), 114(2), . . . , 114(N)) to the balancing circuit (100) via one of a plurality of cell group balancing relays (112(1), 112(2), . . . , 112(N)). Each of the cell groups (114(1), 114(2), . . . , 114(N)) includes one or more battery cells. The battery cells can be lithium-ion batteries or another known or future battery cell type. As will be discussed below, the battery cell groups may be implemented as a battery cell stack, including a string controller (discussed below), a plurality of balancing controllers, a plurality of cell group controllers, a plurality of cell group relays and a plurality of cell groups.

In an embodiment, the cell group controllers (110(1), 110(2), . . . , 110(N)) are implemented on a circuit board (e.g., a printed circuit board) with the cell group balancing relays (112(1), 112(2), . . . , 112(N)). On each circuit board, the cell group balancing relays (112(1), 112(2), . . . , 112(N)) may be implemented as double-pole, single throw (DPST) relays for each cell group. In this example, when a cell group balancing relay is closed, the relay attaches that cell group to the balancing circuit (100). Additional or different relays may be used. Further, additional or different components can be included on the circuit board, such as a balancing controller (discussed below) or one or more microprocessors, microcontrollers, FPGAs, and/or ASICs configured to perform the disclosed behaviors.

In addition to controlling cell group balancing relays (112(1), 112(2), . . . , 112(N)), each of the cell group controllers (110(1), 110(2), . . . , 110(N)) is configured to measure voltage, temperature and other information for its corresponding cell group. The cell group controllers (110(1), 110(2), . . . , 110(N)) are also configured to transmit the measured voltage, temperature and other information to a balancing controller (discussed below) or to another control system coupled to the balancing circuit (100).

The charge balancing circuit (100) also includes a balancing controller (116). For example, the balancing controller (116) is a battery pack controller (BPC) or a like controller. The balancing controller (116) can be implemented by one or more microprocessors, microcontrollers, FPGAs, and/or ASICs. In this embodiment, the balancing controller (116) is responsible for implementing the balancing strategy. For example, the balancing controller (116) configured to balance the plurality of cell groups (114(1), 114(2), . . . , 114(N)) by controlling the charge balancing relay (106), the discharge balancing relay (108) and the plurality of cell controllers (110(1), 110(2), . . . , 110(N)). Further, by controlling by controlling the charge balancing relay (106), the discharge balancing relay (108) and the plurality of cell controllers (110(1), 110(2), . . . , 110(N)), the balancing controller (116) may target specific cell groups independently with passive or active balancing techniques. The balancing controller (116) can also be configured to aggregate data received from the plurality of cell group controllers (110(1), 110(2), . . . , 110(N)), such as measured voltage, temperature and other information for each of the cell groups (114(1), 114(2), . . . , 114(N)), and to store or buffer the data in volatile memory (e.g., registers, cache, RAM) or non-volatile memory (e.g., ROM, EEPROM, flash memory, etc.). The balancing controller (116) may then use the aggregated data to make balancing decisions for the charge balancing circuit (100).

In an embodiment, the balancing controller (116) is configured to balance the plurality of cell groups (114(1), 114(2), . . . , 114(N)) based on an external configuration in conjunction with the measured voltage, temperature and other information received from each of the plurality of cell group controllers (110(1), 110(2), . . . , 110(N)). In one example, the external configuration includes a discharge balancing configuration, a charge balancing configuration, or a no balancing configuration. Additional and/or different external configurations may be provided.

In the example provided above, three balancing configurations may be used in balancing the cell groups (114(1), 114(2), . . . , 114(N)). The balancing configurations may be referred to as balancing states, including a discharge balancing state, a charge balancing state, or a no balancing state. In this example, at any given time, only one balancing configuration is implemented. As such, only one of the charge relay (106) or the discharge relay (108) may be closed at a time, or the charge relay (106) and the discharge relay (108) may both be open.

In an example, a charge balancing configuration may include setting the charge balancing relay (106) closed, setting the discharge balancing relay (108) open, setting one of the cell group balancing relays (112(1)) closed, and setting the other cell group balancing relays (112(2), . . . , 112(N)) open. In this configuration, an individual cell group (112(1)) is charged, such as to a target balancing voltage. Likewise, a discharge balancing configuration may include setting the charge balancing relay (106) open, setting the discharge balancing relay (108) closed, setting one of the cell group balancing relays (112(1)) closed and setting the other cell group balancing relays (112(2), . . . , 112(N)) open. In this configuration, an individual cell group is discharged, such as to a target balancing voltage. Finally, a no balancing configuration may include setting the charge balancing relay (106) open, setting the discharge balancing relay (108) open and the plurality of the cell balancing relays (112(1), 112(2), . . . , 112(N)) open. In this configuration, no cell groups are charged or discharged.

In an embodiment, to facilitate the aforementioned charge balancing configurations, balancing permissions may be provided, such as by a high-level control system (discussed below). For example, a charge balancing permission may include a flag input indicating whether the balancing controller (116) is permitted to charge. If the flag is set to false, the balancing controller (116) is not allowed to close the charge balancing relay (106). Similarly, a discharge balancing permission may include a flag input indicating whether the balancing controller (116) is permitted to discharge. If the flag is set to false, then the balancing controller (116) is not allowed to close the discharge balancing relay (106). Additional and different permissions may be provided, such as to facilitate additional or different external configurations. The high-level control system for setting the permission flags may include battery management system (BMS), an energy management system (EMS), or another high-level control system component, as will be discussed below with respect to FIG. 2.

Figure 2:
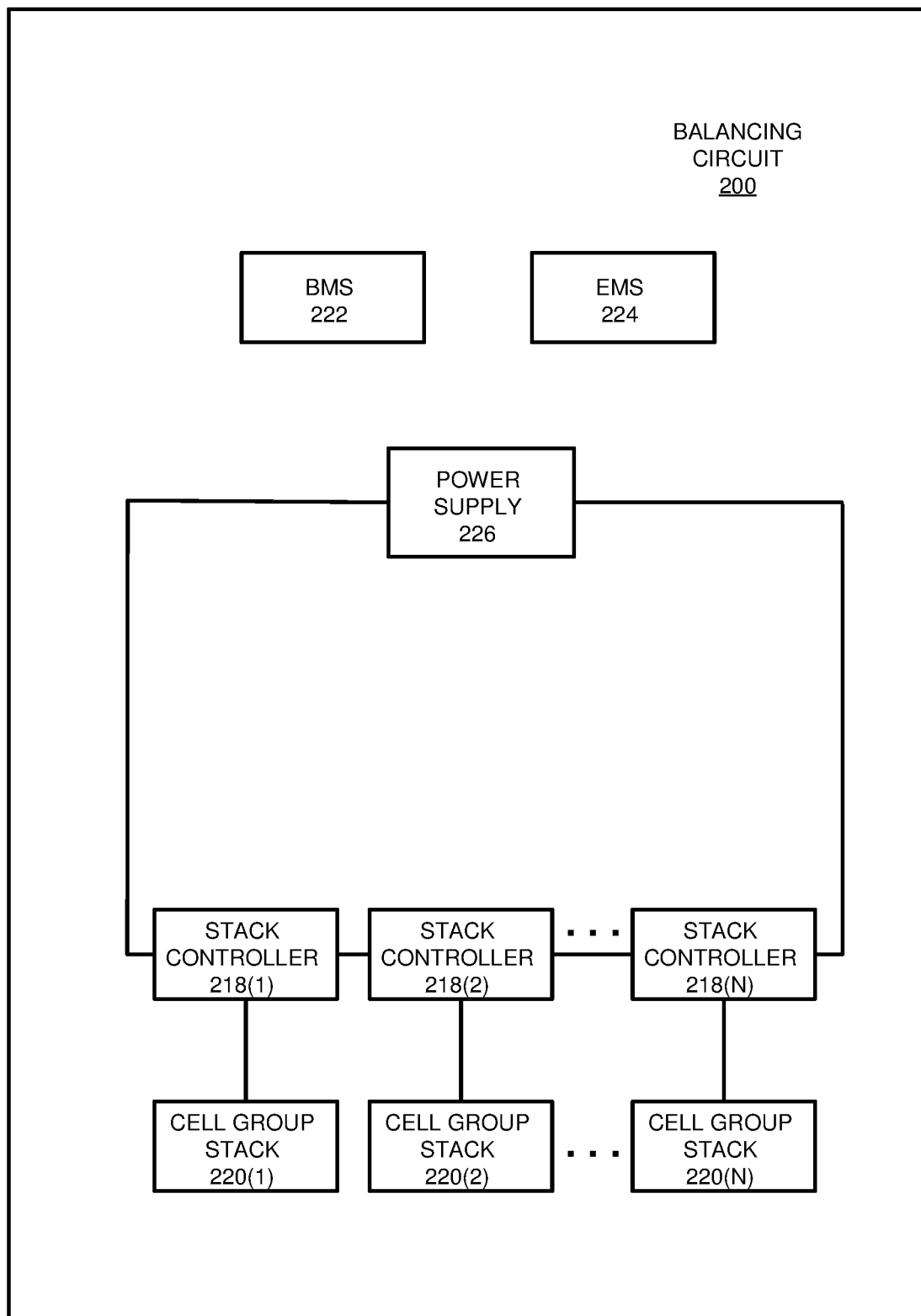
FIG. 2 is a diagram illustrating another example balancing circuit with which one or more of the approaches described herein may be implemented.

FIG. 2 is a diagram illustrating another example balancing circuit with which one or more of the approaches described herein may be implemented. The balancing circuit may be implemented in a larger battery cell balancing system configured to implement a balancing strategy to deliver more efficient battery usage as needed for different use cases. For example, depending on the use case, one or more battery cells may be targeted for passive and active balancing. Further, the targeted passive and active balancing may be provided while the battery cells are in use (e.g., the battery cells are being charged or discharged).

With reference to FIG. 2, the balancing circuit (200) includes a plurality of cell group stacks (220(1), 220(2), . . . , 220(N)). Each cell group stack includes a plurality of battery packs within each stack, as discussed above with respect to FIG. 1. For example, each battery pack includes a voltage source (102) and a load (104). The voltage source (102) is any voltage source capable of charging battery cells. Alternatively, the voltage source (102) is one of a plurality of voltage sources, such as a plurality of battery chargers configured to distribute electric power to a different cell group stack (discussed below). In this example, the voltage source (102) is coupled to power supply (226), as depicted in FIG. 2. For example, the power supply (226) may be coupled to an energy grid and configured to convert alternating current to direct current for charging battery cell groups. Alternatively, the power supply (226) may be configured to provide AC power to the voltage sources (102), with the voltage sources (102) configured to convert alternating current to direct current. Accordingly, the power supply (226) is configured to deliver electric power to the plurality of cell group stacks. As discussed, AC power is provided via the power supply (226). Alternatively, a DC power supply, an inventor, or one or more of the battery cells may be configured to deliver electric power to the plurality of cell group stacks, in lieu or in addition to the power supply (226). In one example, DC power from one or more of the battery cells is delivered to one or more other battery cells for balancing. The load (104) is any electrical load, such as a resistor or another component acting as an electrical load for consuming electric energy. In this embodiment, different battery packs may be simultaneously charged and/or discharged independent of the other battery packs.

In an alternative embodiment, each cell group stack (220(1), 220(2), . . . , 220(N)) includes a dedicated charge relay (106) and dedicated a discharge relay (108) for the stack. Likewise, each stack may also include dedicated voltage sources (102) and loads (104). In this embodiment, different stacks cell group stack (220(1), 220(2), . . . , 220(N)) may be simultaneously charged and/or discharged independent of the other stacks.

The balancing circuit (200) includes a plurality of cell group stacks (220(1), 220(2), . . . , 220(N)). Each cell group stack (220(1), 220(2), . . . , 220(N)) includes a plurality of cell groups, such as cell groups (114(1), 114(2), . . . , 114(N)), a plurality of cell group relays, such as relays (112(1), 112(2), . . . , 112(N)), a plurality of cell group controllers, such as cell group controllers (110(1), 110(2), . . . , 110(N)), and a plurality of balancing controllers, such as balancing controller (116). In a particular embodiment, each stack includes seventeen (17) balancing controllers, but each stack can include additional or fewer balancing controllers. In the embodiment with seventeen (17) balancing controllers, each stack would also have seventeen (17) charge relays (106) and seventeen (17) discharge relays (108). Each balancing controller is configured to control a different circuit for balancing a different subset of the plurality of cell groups via a different subset of cell group controllers and cell group relays. In an alternative embodiment, the cell group stacks (220(1), 220(2), . . . , 220(N)) do not include cell group controllers, and the plurality of cell group relays are controlled directly by the balancing controllers.

The balancing circuit (200) further includes a plurality of stack controllers (218(1), 218(2), . . . , 218(N)). For example, the stack controllers (218(1), 218(2), . . . , 218(N)) are configured as string controllers. The stack controllers (218(1), 218(2), . . . , 218(N)) are each configured to control a different subset of balancing controllers.

In an embodiment, the balancing circuit (200) also includes a battery management system (BMS) (222) and/or an energy management system (EMS) (224). The BMS (222) is configured to control power distribution to the plurality of cell groups by controlling the plurality of stack controllers (218(1), 218(2), . . . , 218(N)). The EMS (224) is configured control power delivery by the power supply (226). The BMS (222) and EMS (224) are high-level control systems for balancing the stacks (220(1), 220(2), . . . , 220(N)). In an example, the BMS (222) and/or EMS (224) are implemented as software control systems on a server computer or within another computing environment, such as a virtual machine environment. For example, the BMS (222) and the EMS (224) can be implemented on one or more server computers, such as computer platforms having hardware that includes one or more central processing units (CPU), a system memory, a random-access memory (RAM) and input/output (I/O) interface(s). The BMS (222) and EMS (224) can be implemented on a single server computer or on a single computing environment. Alternatively, the BMS (222) and EMS (224) may be implemented on a single controller or on multiple controllers.

To implement a balancing strategy, each of the plurality of stack controllers (218(1), 218(2), . . . , 218(N)) is configured to operate based on a balancing mode, or external configuration, received from the BMS (222). For example, the balancing mode may include a target voltage mode for the cell groups within each cell group stack (220(1), 220(2), . . . , 220(N)). In the target voltage mode, cell group voltages are balanced based on the target voltage for the cell groups.

In an embodiment, the balancing controllers for each stack are configured to determine the balancing target voltage for each stack. Alternatively, the balancing controllers are configured to receive a target voltage from the stack controllers (218(1), 218(2), . . . , 218(N)), from the BMS (222), from the EMS (224), or from another component, and to balance each stack based on the received target voltage. Along with the target voltage, the balancing controllers may be configured to receive a balancing strategy for balancing based on the target voltage for each stack.

For example, the balancing controller determines the balancing target voltage as a voltage that the balancing controller will attempt to charge and/or discharge all cell groups to match the target voltage. Referring back to the permissions discussed above, if the charge balancing permission flag is set to be true, any cell below the target voltage will be charge balanced. If the discharge balancing permission flag is set to be true, any cell below the target voltage will be discharge balanced.

The target voltage may be determined based on different cell group and/or cell group stack values. For example, the target voltage may be set as an average of the cells in a cell group, cell group stack or battery pack. Alternatively, the target voltage may be set as a fixed value. In another alternative, the target voltage may be set as the lowest voltage or the highest voltage of a cell in a cell group, cell group stack or battery pack. A target voltage type may be set, based on which of the above values are used for determining the target voltage.

For example, the target voltage type may be set to an average, fixed, lowest or highest. Additional and different target voltage types may be provided based on different cell group and/or cell group stack values, or based on other balancing metrics. The balancing controller may be configured to ignore saved target values that are not being used for the balancing strategy. For example, when a fixed target voltage type is utilized, the average, lowest and highest target voltages are ignored. Likewise, if the voltage type is average, lowest, or highest, the fixed target voltage is ignored.

In addition to the target voltages, some embodiments include dead-band voltages that may be set within the balancing controllers and/or determined by the balancing controllers. For example, a charge balancing voltage dead-band may be set. Based on the charge balancing voltage dead-band, cell group voltages that are greater than the dead-band value (e.g., number of millivolts below the balancing target voltage) do not require balancing and will not be charged. Likewise, a discharge balancing voltage dead-band set, providing for cell group voltages that are greater than the dead-band value (e.g., number of millivolts above the balancing target voltage) do not require balancing and will not be discharged. The dead-band voltages may be modified according to the balancing strategy, such as the cell voltages approach a maximum or minimum voltage. For example, the dead-band voltages may be modified to prevent the battery cells from being overcharged or undercharged (e.g., for safety, longevity, etc.). Further, the dead-band values may be modified to make a balancing strategy more or less aggressive.

As discussed above, to implement a balancing strategy, each of the plurality of stack controllers (218(1), 218(2), . . . , 218(N)) is configured to operate based on a balancing mode, or external configuration, such as received from the BMS (222). In an embodiment, the balancing mode may be an average target voltage mode, a fixed target voltage mode, a low target voltage mode, a high target voltage mode, a charge voltage dead-band mode and a discharge dead-band mode. Additional and different balancing modes may be provided.

To implement the average target voltage mode, the stack controllers will instruct the balancing controllers to charge, to discharge, or to charge and discharge individual cell groups to an average voltage all cell groups. To implement the fixed target voltage mode, the stack controllers are configured to instruct the balancing controllers to charge and/or discharge individual cell groups to a a fixed voltage for all cell groups. To implement the low target voltage mode, the stack controllers are configured to instruct the balancing controllers to charge and/or discharge individual cell groups to a lowest voltage of the cell groups. To implement the high target voltage mode, the stack controllers are configured to instruct the balancing controllers to charge and/or discharge individual cell groups to a highest voltage of the cell groups. To implement the charge voltage dead-band mode, the stack controllers are configured the instruct the balancing controllers to implement one of the above modes, but to ignore cell groups with voltages less than a threshold below the target voltage. To implement the discharge voltage dead-band mode, the stack controllers are configured to instruct the balancing controllers to ignore cell groups having voltages greater than a threshold above the target voltage.

Figure 3:
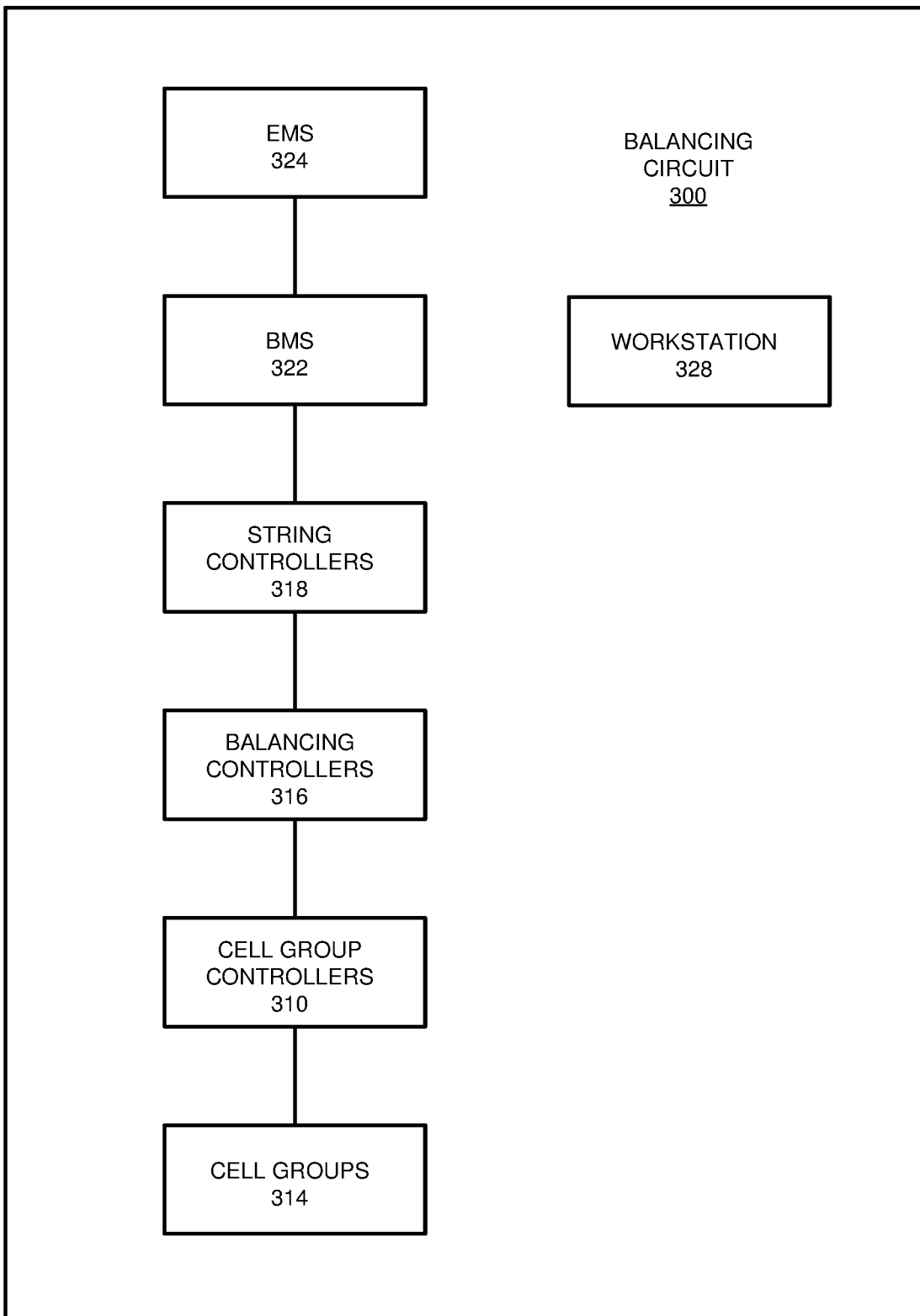
FIG. 3 is a diagram illustrating yet another example balancing circuit with which one or more of the approaches described herein may be implemented.

FIG. 3 is a diagram illustrating yet another example balancing circuit with which one or more of the approaches described herein may be implemented. The balancing circuit may be implemented in a larger battery cell balancing system configured to implement a balancing strategy to deliver more efficient battery usage as needed for different use cases. For example, depending on the use case, one or more battery cells may be targeted for passive and active balancing. Further, the targeted passive and active balancing may be provided while the battery cells are in use (e.g., the battery cells are being charged or discharged).

With reference to FIG. 3, the balancing circuit (300) includes a plurality of cell groups (314) and a plurality of cell group controllers (310). Each cell group controller (310) is configured to control a different cell balance relay, such as cell group relays (112(1), 112(2), . . . , 112(N)), for coupling a different cell groups (314) to the balancing circuit (300), as discussed above. The balancing circuit (300) also includes a plurality of balancing controllers (316). Each balancing controller (316) is configured to control charging and discharging for a different subset of the plurality of cell groups (314). The balancing controller likewise includes a plurality of string controllers (318). Each string controller (318) is configured to control a different subset of the plurality of balancing controllers (316). Accordingly, the cell group controllers (310), the balancing controllers (316) and the string controllers (318) are provided for low-level control of the cell groups (314) of the balancing circuit (300).

In an embodiment, the balancing circuit (300) may also include high-level control for the cell groups (314). For example, the balancing circuit (300) includes a battery management system (BMS) (322) configured to control power distribution in the balancing circuit (300) by controlling the plurality of string controllers (318). By controlling the string controllers (313), the BMS ultimately has control over the cell group controllers (310) and power distribution to the cell groups (314). Accordingly, the BMS (322) controls power distribution within the balancing circuit (300) by charging and/or discharging specific cell groups of the cell groups (314) via the plurality of cell group controllers (310), the plurality of balancing controllers (314) and the plurality of string controllers (318).

In another embodiment, the balancing circuit (300) also includes an energy management system configured to control power delivery to the balancing circuit. For example, while the BMS (322) controls power distribution in the balancing circuit (300), the EMS (324) controls power input to the balancing circuit (300). The EMS (324) is configured to control power distribution by controlling an inventor, such as power supply (226), and/or a voltage source, such as voltage source (102).

The aforementioned components of the balancing circuits 100, 200 and 300 are configured to be coupled together and communicate via software application programming interfaces (APIs) and/or via known or future communication protocols. For example, communication may be facilitated using Modbus, CANbus, DNP3, web services interface or another protocol and to utilize APIs to communicate between components of like and different control levels. In an embodiment, the BMS (322) is configured to communicate with the string controllers (316) via a ModBus API or another balancing application API. In this embodiment, the API exposes or virtually couples a set of ModBus communication points (e.g., MESA-ESS (Energy Storage System) and SunSpec compatible) allowing for the activation and configuration of all balancing applications of downstream components, reporting of current settings, and reporting of current battery states and the impact of the balancing applications.

As discussed above, the balancing controllers (316) are configured to operate in a plurality of balancing states or configurations. For example, the balancing controllers are configured to operate in one or more of a charge balancing state for charging cell groups (314) to a target voltage, a discharge balancing state for discharging cell groups (314) to a target voltage, or a no balancing state for decoupling cell groups (314) from the balancing circuit (300). In the no balancing state, no cell groups (314) are charged or discharged for the purposes of balancing. In an embodiment, when balancing controllers (316) transition between charge balancing and discharge balancing states, or transition between charging or discharging different cell groups (314), the balancing controllers transition to the no balance before charging or discharging the different cell group (314).

Further, at any time, the balancing controllers (316) may execute one of many behaviors. In an embodiment, the balancing controllers (316) may operate in one of three behaviors: balance monitoring; charge balancing; or discharge balancing. As discussed above, in an embodiment, when transitioning from one behavior to the next (e.g., charge balancing to discharge balancing), the balancing controllers will transition through the no balancing or a balance monitoring state. For example, in a no balancing or balance monitoring state, all relays must be opened, and all cell groups must confirm that all cell group relays are open before proceeding with charging or discharging a cell group by closing any relays. In an embodiment, the balancing controllers must also transition through the no balancing or balance monitoring state even if the behavior remains the same (i.e., transitioning from charge balancing one cell group to another cell group). In this example, if the balancing controller transitions from charge balancing a first cell group to charge balancing second cell group, balancing controller will: (1) transition from a charge balancing state to a no balancing state; (2) confirm that all relays are open; and (3) transition from the no balancing state back to the charge balancing state. By transitioning to the no balancing state between charge/discharge balancing states, the balancing controller may provide for safe and reliable operations.

During balance monitoring, a balancing controller monitors each cell group assigned to the balancing controller to determine which cells, if any, need balancing. In an embodiment, the balancing controller performs balance monitoring by periodically calculating a balancing target voltage. The balancing target voltage may be based on the current balancing mode or a fixed balancing target voltage. The balancing controller may further calculate a balance offset voltage for each cell group as a voltage difference that each cell group sits from a dead-band range. Next, for the balancing controller to determine which cells need to be charged and/or discharged, the balancing controller determines if each cell voltage is above or below the balancing target voltage.

If a cell group voltage is above the balancing target voltage, then the balancing controller may proceed in determining how to handle the cell group as follows. If the discharge balancing permission is set to false (e.g., discharge balancing is not permitted), all cell groups are ignored for the purposes of discharge balancing. Next, if a cell group voltage is less than the discharge balancing dead-band (e.g., less than the balancing target voltage value plus a discharge balancing voltage dead-band value), then the cell group is also ignored. Finally, for the remaining cell groups (e.g., cell groups that are not ignored), a balancing offset is calculated for each cell group (e.g., cell group voltage less the balancing target voltage and the discharge balancing voltage dead-band value).

If a cell group voltage is below the balancing target voltage, then the balancing controller may proceed in determining how to handle the cell group as follows. If the charge balancing permission is set to false (e.g., charge balancing is not permitted), all cell groups are ignored for the purposes of charge balancing. Next, if a cell group voltage is greater than the charge balancing dead-band (e.g., greater than the balancing target voltage value less the charge balancing voltage dead-band value), then the cell group is also ignored. Finally, for the remaining cell groups (e.g., cell groups that are not ignored), a balancing offset is calculated for each cell group (e.g., the balancing target voltage less the discharge balancing voltage dead-band value and the cell group voltage).

Based on the calculated balancing offset values, the balancing controller transitions into a balancing behavior. If no cell groups have a balancing offset (e.g., no cell group is outside of the dead-band and/or has the appropriate position to balance based on the permissions), then the balance monitoring process is repeated. However, when balancing offsets are calculated, the cell group with the highest balance offset is selected for balancing. If the selected cell group has a voltage above the balancing target voltage, then the balancing controller transitions to discharge balancing. If the selected cell group has a voltage below the balancing target voltage, then the balancing controller transitions to charge balancing. After balancing the selected cell group, the balancing controller may select another cell group with the next highest balance offset for balancing and transition accordingly.

During charge balancing, a balancing controller charges a cell group, such as by continuing to charge the cell group until the cell group voltage reaches a charge target voltage or another value. As discussed above, a cell group with the highest offset value may be selected for charging. For example, when the balancing controller transitions to charge balancing, energy transmitted or injected into a selected cell group. Energy will continue to be transmitted until the selected cell group voltage is equal to the balancing target voltage. In another embodiment, the selected cell group will continue to be charged until the cell group voltage is within the cell balancing dead-band. While charge balancing, the balancing controller may continue to calculate the balancing target voltage and to determine if the charge balancing should halt. For example, the charge balancing should halt if the charge balancing permission becomes false or the cell group voltage becomes greater than or equal to the balancing target voltage. If the charge balancing is halted, the balancing controller transitions to balance monitoring.

Likewise, during discharge balancing, a balancing controller discharges a cell group, such as continuing to discharge the cell group until the cell group voltage reaches a discharge target voltage or another value. As discussed above, a cell group with the highest offset value may be selected for discharging. For example, when the balancing controller transitions to discharge balancing, energy removed or dissipated from a selected cell group. Energy will continue to be removed until the selected cell group voltage is equal to the balancing target voltage. In another embodiment, the selected cell group will continue to be discharged until the cell group voltage is within the cell balancing dead-band. While discharge balancing, the balancing controller may continue to calculate the balancing target voltage and to determine if the discharge balancing should halt. For example, the discharge balancing should halt if the discharge balancing permission becomes false or the cell group voltage becomes less than or equal to the balancing target voltage. If the discharge balancing is halted, the balancing controller transitions to balance monitoring.

B. Example Applications and Usage Scenarios

As discussed above, instead of having a static, single balancing strategy, one or more the present embodiments provide for multiple balancing applications to be selected and implemented to match the requirements of the present use case. The balancing applications are selected to tailor the aforementioned balancing circuits to a particular use case to employ a passive and active balancing strategy to more efficiently and effectively satisfy the requirements of the use case while increasing safety and lifespan of the battery cells.

Figure 4:
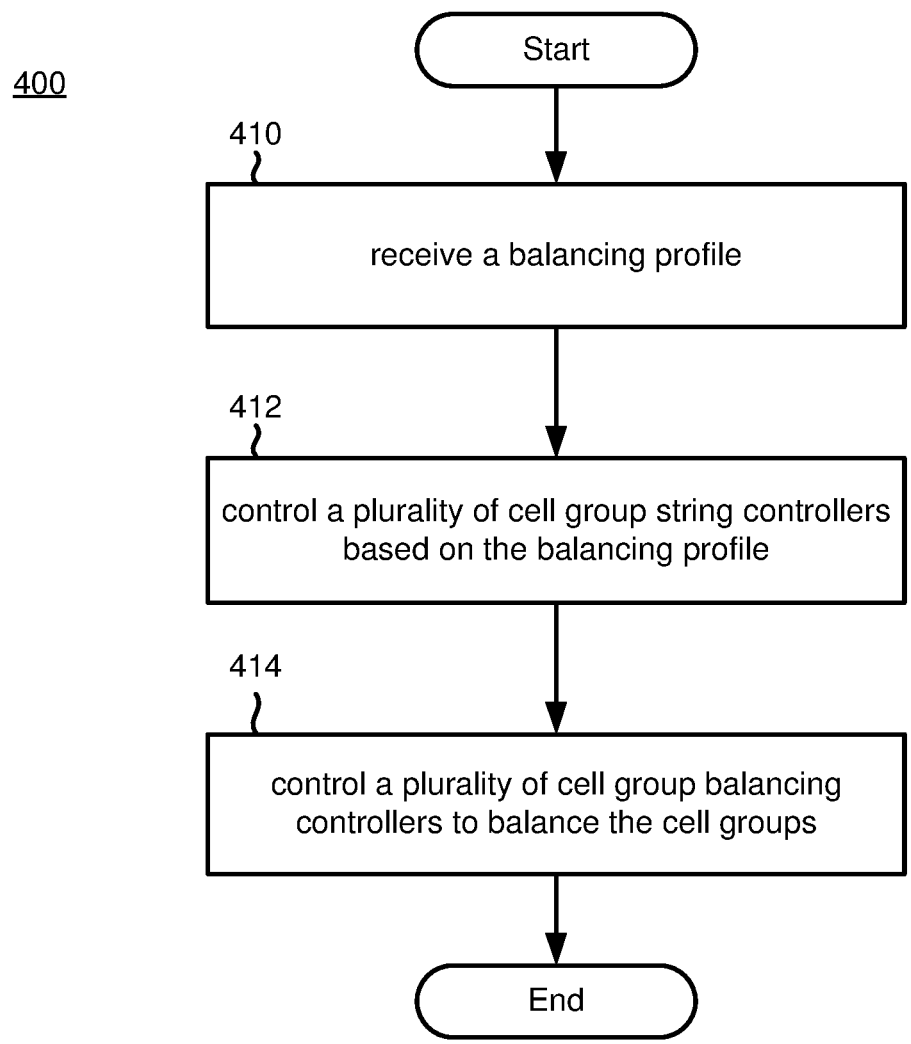
FIG. 4 is a flowchart of an example embodiment for balancing cell groups based on a balancing profile.

FIG. 4 is a flowchart of an example embodiment for balancing cell groups based on a balancing profile. The method can be implemented by any of the systems of FIGS. 1-3 and/or a different system. Additional, different or fewer acts may be provided. For example, various acts may be omitted or performed by a separate system. Although the method is presented in the illustrated order, other orders may be provided and/or acts may be repeated, such as repeating acts 410, 412 and 414 based on receiving a different balancing profile.

At act 410, a balancing profile is received for balancing battery cells in a balancing circuit. In an embodiment, a battery management system (BMS) or an energy management system (EMS) receives the balancing profile via an application programming interface (API) from a user device, such as a mobile device or a workstation (328) coupled to the EMS, the BMS or another component of the balancing circuit (300). The workstation (328) may operate in a client-server implementation, wherein the workstation (328) is remote from other components of the balancing circuit (300). The workstation (328) may be implemented as a computer platform having hardware that includes one or more central processing units (CPU), a system memory, a random-access memory (RAM) and input/output (I/O) interface(s).

For example, the workstation presents a predefined or user configurable set, library or menu of balancing profiles that may be enabled and configured for different use cases for the battery cells. In another embodiment, the balancing profile is received by the BMS from EMS, or another control system component, to automatically select a balancing profile based on a use case application of the battery cells. As discussed above, the API may be implemented using known or future communication protocols, such as Modbus, CAN-bus, DNP3, web services interface or another protocol allowing the APIs to communicate between components of like and different control levels.

The balancing profiles may rely on balancing reporting from the stacks including the current state of the battery cell groups and the impact of the current balancing profile on the battery cells. Additionally, balancing profiles may be provided using a schedule. For example, balancing profiles may be implemented using the time-of-day, dates, and sets of stacks create balancing times for different stacks within the balancing circuit. As such, the balancing schedule would be an overlay for the balancing profiles, altering the functionality of the system to optimize for time of use, efficiency, consumption needs and/or other factors. For example, battery cell groups are often deployed for solar generation and configured to store the energy generated by solar cells. Solar generation follows a predictable schedule curve, and matching the balancing strategy to the schedule curve may allow the balancing strategy to be tuned appropriately (e.g., knowing that the battery cells will likely charge slowly early in the day, that the battery cells will not charge at night, etc.) Additionally, many other balancing strategies and use case applications are schedule driven. For example, if a schedule requires maximum energy at a specific time during the day (e.g., participation in an energy market), then knowing that the battery cells must be fully charged at a specific time may be a critical input to the balancing strategy.

In an embodiment, the library of predefined or user configurable balancing profiles includes two or more of: a no balancing profile; a basic balancing profile; a full discharge optimizing profile; a full charge optimizing profile; a slow charge optimizing profile; a slow discharge optimizing profile; and a high efficiency profile. Additional and different balancing profiles may be included in the library. For example, the library of balancing profiles may further include one or more additional balancing profiles defined to manage voltage differences between cell groups based on additional or different use cases for the battery cell groups.

For example, with reference to FIG. 3, the BMS (322) includes a no balancing profile that is configured to do no balancing at all. In other words, voltage differences between cell groups (314) are not minimized. As discussed above, the no balancing profile may be implemented when the BMS (322) transitions between balancing profiles.

The BMS (322) may also include a basic balancing profile that is configured to minimize voltage differences between cell groups by balance cell groups by charging and/or discharging cell groups. For example, the basic balancing profile includes an out-of-balance trigger value (e.g., in mV), an in-balance trigger value (e.g., in mV), and a cell voltage dead-band (e.g., in mV). In this example, the balancing controllers (316) monitor cell groups (314) to determine if any cell groups (314) have cell voltages outside of the cell voltage dead-band. Starting with the cell group with the highest difference with respect to the average cell voltage for the cell groups (314), cell groups are charged and/or discharged to equalize cell group voltages between all cell groups (314). Specifically, if the cell voltage spread between the cell group voltage and the average voltage for the cell groups is greater than the out-of-balance trigger value, the cell group is actively or passive balanced until the cell group voltage is equal to the average voltage for the cell groups or is within the in-balance trigger value.

In another embodiment of a basic balancing profile, voltage differences between cell groups are minimized irrespective of battery state of charge (SOC) values. As such, cell groups are charged or discharged if the cell group voltages are outside of a balancing dead-band around the average cell group voltage. In yet another embodiment, the basic balancing profile is configured to balance the cell groups based on dead-band values. For example, based on the basic balancing profile, the balancing controller identifies a subset of the cell groups with voltages outside of the dead-band values, determines a cell group from the subset of cell groups as having the highest voltage difference from an average voltage of the cell groups, and charges or discharges the cell group. The balancing controller then repeats the process to balance the cell group with the next highest voltage difference from the average voltage of the cell groups.

The BMS (322) may also include a full charge optimizing balancing profile that is configured similarly to the basic balancing profile, however the full charge balancing profile only passively balances down cell groups that are above a dead-band value. In this example, the BMS (322) dynamically adjusts the dead-band to work the voltage knee aggressively. For example, because the relationship between state of charge (SOC) (e.g., from 0% to 100%) and voltage is not a straight line, near the edges of the SOC range, a small change in SOC may require a very large change in voltage, resulting in an increased risk when operating a battery cell from the plateau through the knee of the curve because the battery cell may be accidently driven to a dangerously low (or high) voltage. Therefore, dynamically adjusting the dead-band as the battery cells are charged from the plateau through the knee of the curve may increase safety while aggressively charging the battery cells. As such, active balancing is only used for cell groups that are far outside the dead-band value and far from the average voltage that the cell groups become dangerous. By dynamically adjusting the dead-band, battery cells well above or below the average are more aggressively balanced, allowing more of the knee area of the curve to be a usable SOC range.

In another embodiment, a full charge optimizing profile is configured to manage cell voltage differences between cell groups in order to maximize the battery SOC values by charging cell groups with lowest voltages. In this example, only cell groups with voltages above a high-charge threshold are discharged. In yet another embodiment, a full charge optimizing profile is configured to balance cell group voltages up. In this example, only cell groups with voltages above a high-charge threshold are balanced down and cell groups with voltages below the low charge dead-band are balanced up.

The BMS (322) may also include a full discharge optimizing balancing profile that is configured similarly to the basic balancing profile, however the full discharge balancing profile only actively balances up cell groups that are below a dead-band value. Again, in this example, the BMS (322) dynamically adjusts the dead-band to work the voltage knee aggressively. As such, passive balancing is only used for cell groups that are far outside the dead-band value and far from the average voltage that the cell groups become dangerous.

In another embodiment, a full discharge optimizing profile is configured to manage voltage differences between cell groups in order to minimize the battery SOC values by discharging cell groups with highest voltages. In this example, only cell groups with voltages below a low-charge threshold are charged. In yet another embodiment, a full discharge optimizing profile is configured to balance cell group voltages down. In this example, only cell groups with voltages below a low-charge threshold are balanced up and only cell groups with voltages above of the high discharge dead-band are balanced down.

The BMS (322) may also include a slow charge optimizing profile that is configured similarly to the basic balancing profile, however given a target voltage, the voltage source is used to slowly raise all cells to the target voltage. For example, the slow charge profile manages voltage differences between cell groups to increase battery SOC values by charging or discharging cell groups with voltages outside of a charge dead-band. Further, the voltage charge dead-band is decreased as cell group voltages approach a high-charge threshold.

The BMS (322) may also include a slow discharge optimizing profile that is configured similarly to the basic balancing profile, however given a target voltage, the load is used to slowly raise all cells to the target voltage. For example, the discharge profile manages voltage differences between cell groups to decrease cell group SOC values by charging or discharging cell groups with voltages outside of an discharge dead-band. Further, the discharge dead-band is decreased as cell group voltages approach a low-charge threshold.

In an embodiment, a charge profile and a discharge profile are configured to balance cell group voltages up or down to a target voltage by charging or discharging cell groups with voltages outside of a dead-band. Further, the dead-band is decreased as cell group voltages approach a high-charge threshold or a low-voltage threshold, respectively.

The BMS (322) may also include a high efficiency profile configured to implement variants of the above balancing profiles that only balance cell groups up or down as cell group voltages to maintain maximum efficiency, such as when cell group voltages approach the voltage knees. For example, the high efficiency profile manages voltage differences between cell groups in order to minimize charging and discharging of the cell groups, such as to minimize energy consumption and/or dissipation. In an embodiment, only cell groups voltages with voltages approaching the high-charge threshold or the low-charge threshold are balanced.

In an embodiment, the high efficiency profile is configured to balance cell group voltages to a target voltage by minimizing the overall charging and discharging the cell groups to consume and dissipate less energy than other balancing profiles, such as by minimizing energy consumption and dissipation. For example, cell group voltages that are not approaching a high-charge threshold or a low-charge threshold may not be balanced.

Referring back to FIG. 4, at act 412, a plurality of cell group string controllers is controlled based on the received balancing profile. In an embodiment, the BMS controls the plurality of cell group string controllers by instructing the string controllers to balancing each battery cell stack based on the balancing profile. As discussed above, each string controller is configured to control a different subset of balancing controllers.

At act 414, a plurality of cell balancing controllers is controlled by the cell group string controllers based on the received balancing profile. In an embodiment, each cell group balancing controller balances a different plurality of cell groups. As discussed above, each balancing controller is configured to control a different subset of cell group controllers to balance the cell groups. The cell group controllers, balancing controllers and string controllers provide for low-level control of the cell groups based on the received balancing controller.

Referring back to FIGS. 1-3, exemplary cell group balancing systems are provided. For example, with respect to FIG. 3, a cell group balancing system may be implemented as the balancing circuit (300). The balancing circuit (300) includes a plurality of cell groups (314) and a plurality of cell group controllers (310). As discussed above, each of the cell group controllers (310) are configured for a different cell group of the plurality of cell groups (314). The balancing circuit (300) also includes a plurality of balancing controllers (316) configured to control a different subset of the plurality of cell group controllers (310) and a plurality of string controllers (318) configured to control a different subset of the plurality of balancing controllers (316). In this embodiment, the cell group controllers (310), the balancing controllers (316) and the string controllers (318) are provided for low-level control of the cell groups (314) of the balancing circuit (300).

The balancing circuit (300) includes further includes a battery management system (BMS) (322) configured to control the plurality of string controllers (318) and an energy management system (EMS) (324) configured to implement a balancing technique for balancing cell groups based on a user selected balancing application. The BMS (322) and the EMS (324) are provided for high-level control of the cell groups (314) of the balancing circuit (300). As discussed above, the aforementioned low-level and high-level control components may communicate application programming interfaces (APIs), such as according to Modbus, CANbus, DNP3, web services interface or another communication protocol.

Figure 5:
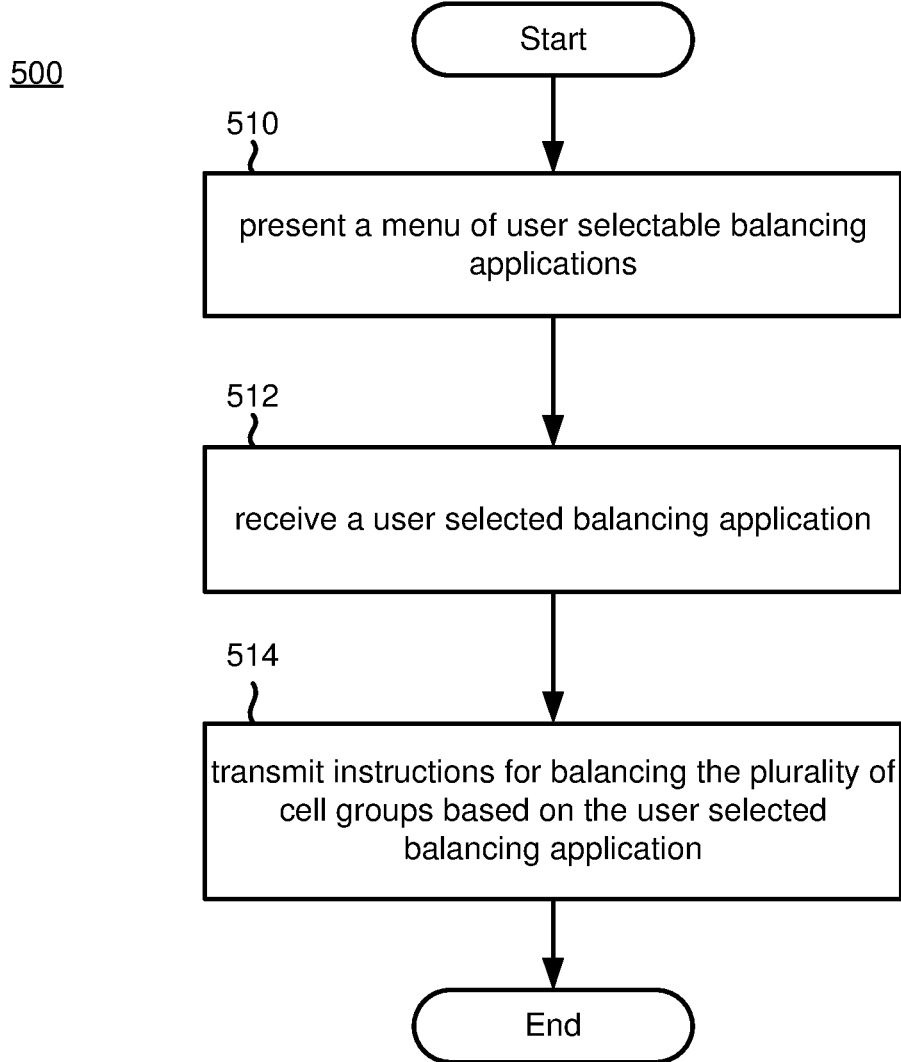
FIG. 5 is a flowchart of an example embodiment for performing a balancing technique for balancing cell groups based on a user selected balancing application.

FIG. 5 is a flowchart of an example embodiment for performing a balancing technique for balancing cell groups based on a user selected balancing application. As discussed above, the method may be implemented by the system of FIGS. 1-3 and/or on a different system. Additional, different or fewer acts may be provided. For example, various acts may be omitted or performed by a separate system. Although the method is presented in the illustrated order, other orders may be provided and/or acts may be repeated, such as repeating acts 510, 512 and 514 based on re-presenting the menu and receiving a different user selectable balancing application.

At act 510, a menu of user selectable balancing applications is presented to a user. In an example, the user selectable balancing applications are presented via a graphical user interface, such as at a user workstation. For example, the menu may include predefined balancing applications, such as: a no balancing application; a basic balancing application; a full discharge optimizing application; a full charge optimizing application; a slow charge optimizing application; a slow discharge optimizing application; and a high efficiency application. Further, the menu may include additional customizable balancing applications. Additional and different balancing applications may be included in the library.

In one exemplary embodiment, a basic graphical user interface presents a menu to the user for controlling one or more stacks or battery packs within the stacks to be targeted and provided with a balancing mode (e.g., no balancing, average target voltage mode, a fixed target voltage mode, a low target voltage mode, a high target voltage mode, a charge voltage dead-band mode and a discharge dead-band mode, or another mode), a target voltage type (e.g., average, fixed, lowest, highest, or another type), an optional voltage target, permissions to charge/discharge cell groups, charge and discharge dead-bands, and other balancing settings. As such, the basic graphical user interface may be configured for very specific control of individual balancing scenarios, such as in the case of maintenance or operational events. In another embodiment, balancing application graphical user interface may be provided for higher level balancing applications for implementing a balancing strategy, such as by selecting a preconfigured balancing application (e.g., a no balancing application, a basic balancing application, a full discharge optimizing application, a full charge optimizing application, a slow charge optimizing application, a slow discharge optimizing application, a high efficiency application, or another application). In a further embodiment, a high-level graphical user interface is configured to pair balancing applications with energy management applications. For example, an energy management application may be selected to implement a higher level balancing strategy (e.g., "charge battery to full by 4 AM"), which is paired with an applicable balancing application (e.g., a full charge optimizing application, a slow charge optimizing application, a high efficiency application, or another application) based on the higher level balancing strategy. Additional and different graphical user interfaces may be provided, and the aforementioned example interfaces may be combined and/or used concurrently.

At act 512, a user selected balancing application is received from the user. In an example, the user selected balancing application is received by the user workstation via the graphical user interface. The user may select the balancing application based on how the battery cells are being used. For example, different balancing applications may be selected for the different requirements of grid and microgrid energy storage and management, and for renewable energy integration. For example, during summer months, energy consumption increases dramatically during daylight hours (e.g., as a result increased demand for air-conditioning, etc.). Accordingly, during evening hours, a full charge optimizing application may be selected to prepare for the increase in demand for the following day. In another example, the battery cells may be configured to provide for a full discharge at a given time during the next day. Therefore, a balancing application may be selected to drive the battery cells to a maximum SOC the night before during a charge cycle, to keep the battery cells fully charged without a power supply during the lead-up period, and to provide for maximum discharge during the given time the next day or during an event. In yet another example, the battery cells may be configured to provide for a balanced frequency response at all times, using the entire SOC range. Accordingly, a balancing application may be selected to keep the balance the battery cells to an average SOC, or as closely balanced as possible. Alternatively, the battery cells may be configured to provide for a balanced frequency response at all times, but only using a middle slice of the SOC range (e.g., 20% to 80%). In that case, the balancing application may be selected for high energy efficiency, only balancing cells that were far out of range. In a further example, the battery cells may be configured to provide for unbalanced services during the day, with an expectation of full charging at night. As such, an average balancing application may be selected during the day, then a charge optimizing balancing application may be selected at night. Further, if a charge period was narrow (e.g., as with frequency response applications), a balancing application may be selected for quick charging, and if the charge period was wide, the balancing application may be selected for full charging. Additional and different use cases may be provided, with one or more different balancing applications selected based on the use case.

At act 514, instructions for balancing the plurality of cell groups are transmitted based on the user selected balancing application. In an example, the instructions are transmitted via an application programming interface (API) to one or more of the aforementioned low-level and high-level control components. As discussed above, balancing APIs are configured for communication between components in the balancing circuit to allow for the activating and configuring downstream components to implement the selected balancing application, reporting of current settings, reporting of current battery states and reporting the impact of the balancing applications. In one or more embodiments, the API is configured to transmit the instructions for balancing the plurality of cell groups to the balancing controllers. Additionally or alternatively, the API is configured to transmit the instructions for balancing the plurality of cell groups to the plurality of string controllers. Further, additionally or alternatively, the API is configured to transmit the instructions for balancing the plurality of cell groups to the BMS and/or EMS.

As discussed above, the balancing applications may be implemented using a schedule. For example, the selected balancing application may be tailored to the time-of-day, date, and subset of stacks within the balancing circuit. As such, the schedule may alter the functionality of the selected balancing application to optimize for time of use, efficiency, consumption needs and/or other factors.

Figure 6:
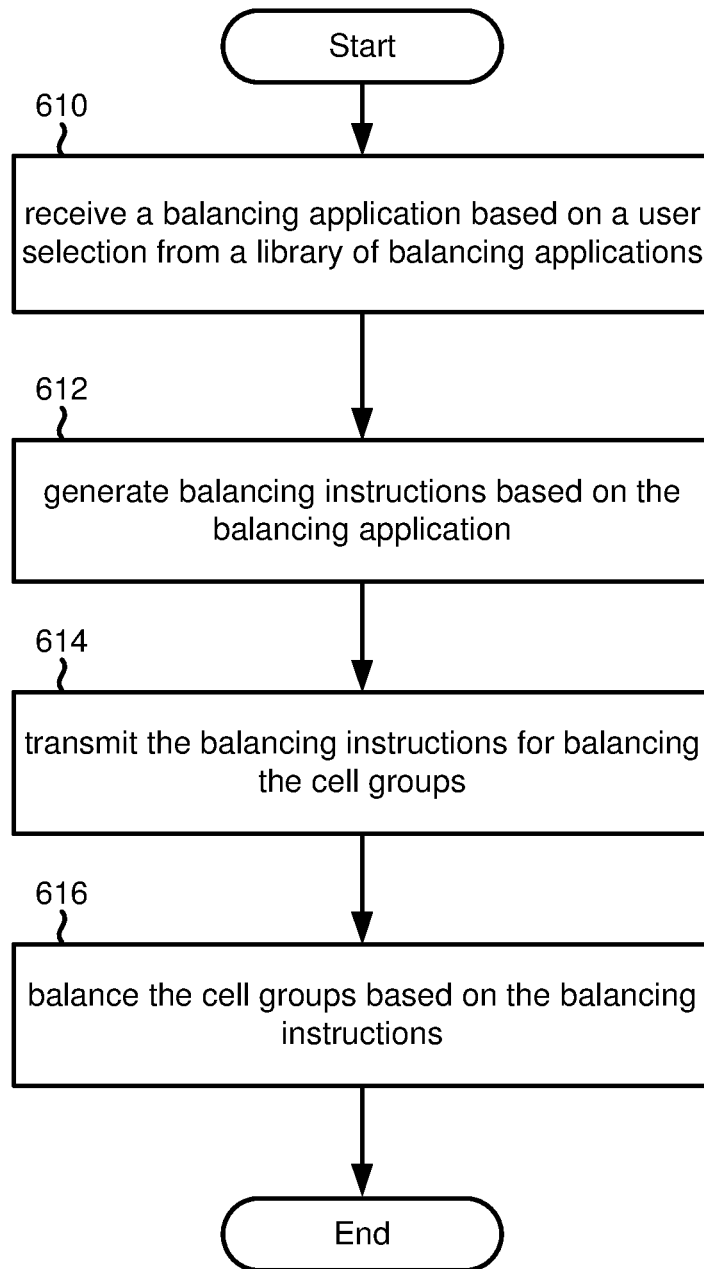
FIG. 6 is a flowchart of another example embodiment for performing a balancing technique for balancing cell groups based on a user selected balancing application.

FIG. 6 is a flowchart of another example embodiment for performing a balancing technique for balancing cell groups based on a user selected balancing application. The method is implemented by the system of FIGS. 1-3 and/or a different system. Additional, different or fewer acts may be provided. For example, various acts may be omitted or performed by a separate system. Although the method is presented in the illustrated order, other orders may be provided and/or acts may be repeated, such as repeating acts 610, 612, 614 based on receiving a different balancing application.

At act 610, a balancing application is received based on a user selection from a library of balancing applications. In an embodiment, the balancing application is received by an energy management system (EMS). The EMS is configured to provide an application framework for configuring and managing of different balancing applications, compatible with existing balancing circuits. The balancing application is selected from a library of balancing applications that includes multiple available predefined balancing applications configured for different use cases for the cell groups. Further, customizable balancing applications may be selected to further configure an application to a use case for the cell groups At act 612, balancing instructions are generated by the EMS, by a battery management system (BMS) or by another high-level control system component based on the received balancing application. The instructions are generated for implementing the balancing application on low-level control system components (e.g., string controllers, balancing controllers, cell group controllers and/or other controllers).

At act 614, the balancing instructions are transmitted for balancing the cell groups. In an embodiment, the instructions are transmitted from high-level control components to low-level cell group control components via an application programming interface (API).

At act 616, the cell groups are balanced based on the balancing instructions. In this embodiment, the cell groups are balanced via low-level cell group control components, as discussed above.

IV. Concluding Remarks

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

I claim:

1. A method for balancing cell groups, the method comprising:
   receiving, by a battery management system via an application programming interface (API), a balancing profile, wherein the battery management system is configured to optimize balancing cell groups by charging, discharging, or charging and discharging cell groups based on the received balancing profile;
   controlling, by the battery management system, a plurality of cell group string controllers based on the received balancing profile; and
   controlling, by the plurality of cell group string controllers, a plurality of cell group balancing controllers to balance the cell groups,
   wherein the balancing profile is received by the battery management system after the balancing profile is selected from a library of multiple available predefined balancing profiles,
   wherein the multiple available predefined balancing profiles include two or more of:
      a no balancing profile wherein voltage differences between cell groups are not minimized;
      a basic balancing profile wherein voltage differences between cell groups are minimized irrespective of battery state of charge (SOC) values by charging or discharging cell groups with voltages outside of a balancing dead-band around the average cell group voltage;
      a full charge optimizing profile wherein voltage differences between cell groups are managed to maximize the battery SOC values by charging cell groups with lowest voltages, wherein only cell groups with voltages above a high-charge threshold are discharged;
      a full discharge optimizing profile wherein voltage differences between cell groups are managed to minimize the battery SOC values by discharging cell groups with highest voltages, wherein only cell groups with voltages below a low-charge threshold are charged;
      a charge profile wherein voltage differences between cell groups are managed to increase battery SOC values by charging or discharging cell groups with voltages outside of a charge dead-band, wherein the voltage charge dead-band decreases as cell group voltages approach the high-charge threshold;
      a discharge profile wherein voltage differences between cell groups are managed to decrease cell group SOC values by charging or discharging cell groups with voltages outside of an discharge dead-band, wherein the discharge dead-band decreases as cell group voltages approach the low-charge threshold; and
      a high efficiency profile wherein voltage differences between cell groups are managed to minimize charging and discharging the cell groups, wherein the cell group voltages are not approaching the high-charge threshold or the low-charge threshold.

2. The method of claim 1, wherein the balancing profile is a user selected balancing profile received from an energy management system.

3. The method of claim 1, wherein the library of multiple available predefined balancing profiles further includes one or more additional balancing profiles defined to manage voltage differences between cell groups based on use cases for the battery.

4. The method of claim 3, wherein the balancing profile comprises a basic balancing profile to balance the cell groups based on dead-band values, wherein controlling, based on the basic balancing profile, the plurality of balancing controllers comprises:
identifying a subset of the cell groups with voltages outside of the dead-band values;
determining, for the subset of cell groups, a cell group with a highest voltage difference from an average voltage the cell groups; and
charging or discharging the cell group with the highest voltage difference from the average voltage of the cell groups.

5. The method of claim 1, wherein the balancing profile comprises a full charge optimizing profile to balance cell group voltages up, wherein only cell groups with voltages above a high-charge threshold are balanced down, and cell groups with voltages below the low charge deadband are balanced up.

6. The method of claim 1, wherein the balancing profile comprises a full discharge optimizing profile to balance cell group voltages down, wherein only cell groups with voltages below a low-charge threshold are balanced up, and cell groups with voltages above of the high discharge deadband are balanced down.

7. The method of claim 1, wherein the balancing profile comprises a charge profile or a discharge profile to balance cell group voltages up or down to a target voltage by charging or discharging cell groups with voltages outside of a dead-band, wherein the dead-band decreases as cell group voltages approach a high-charge threshold or a low-voltage threshold.

8. The method of claim 1, wherein the balancing profile comprises a high efficiency profile to balance cell group voltages to a target voltage by minimizing charging and discharging the cell groups, wherein the cell group voltages are not approaching a high-charge threshold or a low-charge threshold.

9. A cell group balancing system comprising:
a plurality of cell groups;
a battery management system configured to receive, via an application programming interface (API), a balancing profile, wherein the battery management system is configured to optimize balancing cell groups by charging, discharging, or charging and discharging cell groups based on the received balancing profile; and
an energy management system configured to:
present, via a graphical user interface, a menu of user selectable balancing profiles;
receive, via the graphical user interface, a user selected balancing profile; and
transmit, to the battery management system via the API, the user selected balancing profile,
wherein the menu of user selectable balancing profiles comprises two or more of:
a no balancing profile wherein voltage differences between cell groups are not minimized;
a basic balancing profile wherein voltage differences between cell groups are minimized irrespective of battery state of charge (SOC) values by charging or discharging cell groups with voltages outside of a balancing dead-band around the average cell group voltage;
a full charge optimizing profile wherein voltage differences between cell groups are managed to maximize the battery SOC values by charging cell groups with lowest voltages, wherein only cell groups with voltages above a high-charge threshold are discharged;
a full discharge optimizing profile wherein voltage differences between cell groups are managed to minimize the battery SOC values by discharging cell groups with highest voltages, wherein only cell groups with voltages below a low-charge threshold are charged;
a charge profile wherein voltage differences between cell groups are managed to increase battery SOC values by charging or discharging cell groups with voltages outside of a charge dead-band, wherein the voltage charge dead-band decreases as cell group voltages approach the high-charge threshold;
a discharge profile wherein voltage differences between cell groups are managed to decrease cell group SOC values by charging or discharging cell groups with voltages outside of an discharge dead-band, wherein the discharge dead-band decreases as cell group voltages approach the low-charge threshold; and
a high efficiency profile wherein voltage differences between cell groups are managed to minimize charging and discharging the cell groups, wherein the cell group voltages are not approaching the high-charge threshold or the low-charge threshold.

10. The system of claim 9, further comprising:
a plurality of cell group controllers, each cell group controller configured for a different cell group;
a plurality of balancing controllers, each cell group controller operable to control a different subset of the plurality of cell group controllers,
wherein the API is configured to transmit the instructions for balancing the plurality of cell groups to the balancing controllers.

11. The system of claim 9, further comprising:
a plurality of cell group controllers, each cell group controller configured for a different cell group;
a plurality of balancing controllers, each cell group controller operable to control a different subset of the plurality of cell group controllers;
a plurality of string controllers, each string controller configured to control a different subset of the plurality of balancing controllers,
wherein the API is configured to transmit the instructions for balancing the plurality of cell groups to the plurality of string controllers.

12. The system of claim 9, further comprising:
a plurality of cell group controllers, each cell group controller configured for a different cell group;
a plurality of balancing controllers, each cell group controller operable to control a different subset of the plurality of cell group controllers; and
a plurality of string controllers, each string controller configured to control a different subset of the plurality of balancing controllers,
wherein the battery management system is configured to control the plurality of string controllers,
wherein the API is configured to transmit instructions for balancing the plurality of cell groups from the battery management system.

13. The system of claim 9, wherein the API comprises a Modbus, CANbus, DNP3 or web services interface.

14. The system of claim 9, wherein the API is configured to transmit information operable to:
activate the user selected balancing profile;
report current balancing settings; and
report current cell group statuses.

15. The system of claim 9, wherein the user selected balancing profile is configured to report a current balancing state.

16. The system of claim 9, wherein the instructions for balancing the plurality of cell groups is further based on a time-of-day, a date and subsets of the plurality of a plurality of cell groups.

17. A method for balancing cell groups, the method comprising:
   receiving a balancing profile based on a user selection from a library of balancing profiles, wherein the received balancing profile is configured to optimize balancing cell groups by charging, discharging, or charging and discharging cell groups;
   generating balancing instructions based on the balancing profile;
   transmitting, via an application programming interface (API), the balancing instructions for balancing the cell groups; and
   balancing, via low level cell group control, the cell groups based on the balancing instructions,
   wherein the library of balancing profiles comprises two or more of:
      a no balancing profile wherein voltage differences between cell groups are not minimized;
      a basic balancing profile wherein voltage differences between cell groups are minimized irrespective of battery state of charge (SOC) values by charging or discharging cell groups with voltages outside of a balancing dead-band around the average cell group voltage;
      a full charge optimizing profile wherein voltage differences between cell groups are managed to maximize the battery SOC values by charging cell groups with lowest voltages, wherein only cell groups with voltages above a high-charge threshold are discharged;
      a full discharge optimizing profile wherein voltage differences between cell groups are managed to minimize the battery SOC values by discharging cell groups with highest voltages, wherein only cell groups with voltages below a low-charge threshold are charged;
      a charge profile wherein voltage differences between cell groups are managed to increase battery SOC values by charging or discharging cell groups with voltages outside of a charge dead-band, wherein the voltage charge dead-band decreases as cell group voltages approach the high-charge threshold;
      a discharge profile wherein voltage differences between cell groups are managed to decrease cell group SOC values by charging or discharging cell groups with voltages outside of an discharge dead-band, wherein the discharge dead-band decreases as cell group voltages approach the low-charge threshold; and
      a high efficiency profile wherein voltage differences between cell groups are managed to minimize charging and discharging the cell groups, wherein the cell group voltages are not approaching the high-charge threshold or the low-charge threshold.

18. The method of claim 17, wherein the library of balancing profiles comprises balancing profiles configured for different use cases for the cell groups.

* * * * *